Patented Feb. 15, 1938

2,108,147

UNITED STATES PATENT OFFICE 2,108,147

PRODUCTION OF AMINES

Walter Speer, Ludwigshafen-on-the-Rhine, Germany, assignor to I. G. Farbenindustrie Aktiengesellschaft, Frankfort-on-the-Main, Germany No Drawing. Application September 8, 1934, Serial No. 743,310. In Germany September 9, 1933

8 Claims. (Cl. 260—127)

The present invention relates to the production of secondary or tertiary amines.

I have found that amines containing at most one hydrogen atom attached to an amino nitrogen atom, can be obtained in a simple manner by causing carbonyl compounds selected from the group consisting of ketones and aldehydes to act at elevated temperatures in the presence of formic esters, in particular methyl formate, on amines containing from 1 to 2 hydrogen atoms attached to an amino nitrogen atom. The reaction may be carried out at temperatures between about 100° and 350° C., usually between 170° and 300° C.; the most preferred range of temperature is from 210° to 260° C. The most suitable temperature depends on the initial materials used.

Any aliphatic, cycloaliphatic, aliphatic-aromatic, aromatic or heterocyclic primary or secondary amine may be employed, as for example aniline, N-methylaniline, N-ethylaniline, toluidine, xylidine, anisidine, cresidine, N-butyl-cresidine, diphenylamine, naphthylamine, dodecylamine, cyclohexylamine and piperidine. Diamines and polyamines may also be employed. As examples of suitable ketones and aldehydes there may be mentioned: formaldehyde, acetaldehyde, butyraldehyde, benzaldehyde, acetone, acetophenone, cyclohexanone and benzalacetone. As suitable formic acid esters, ethyl formate, propyl formate, butyl formate and hexyl formate may be employed. Methyl formate is used in many cases with special advantage.

While it is possible to carry out the process under ordinary or somewhat decreased pressure (for example converting aniline in the vapor phase into isopropylaniline by means of acetone and methyl formate), it is usually preferred to heat the components in a closed vessel. The reaction proceeds according to the scheme

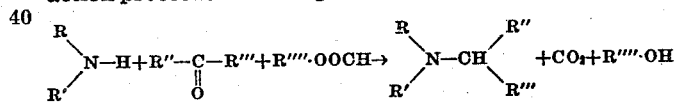

in which

is the radicle of any primary or secondary amine, R″ is hydrogen or any alkyl, cycloalkyl, aryl or aralkyl radicle, and R‴ and R″″ are any alkyl, cycloalkyl, aryl or aralkyl radicles. As can be seen from this scheme carbon dioxide is developed in the reaction and hereby pressure is produced the amount of which depends on the proportions of the formic ester employed, on the quantity of the reaction mass as compared with the volume of the vessel and the further reaction conditions. In a preferred form of carrying out the process the pressure-vessel is provided with a reflux-condenser and the carbon dioxide is partially released continuously, the pressure thus being kept at a desired amount. This pressure varies in wide limits (depending upon the nature of the components and the reaction temperature), for example between about 10 and 100 atmospheres, preferably between about 40 and 60 atmospheres. The reaction components may be employed in molecular proportions, but the component

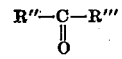

is usually in excess.

The following examples will further illustrate the nature of this invention, but the invention is not restricted to these examples. The parts are by weight.

*Example 1*

143 parts of alpha-naphthylamine, 60 parts of methyl formate and 58 parts of acetone are heated for two hours at about 210° C. in an autoclave. After cooling, the carbon dioxide formed is allowed to escape and the contents of the autoclave are distilled. Under a pressure of 22 millimetres, N-mono-isopropyl-alpha-naphthylamine passes over at between 185° and 186° C.; it is obtained in a yield of 90 per cent of the theoretical yield. The conversion of beta-naphthylamine into N-mono-isopropyl-beta-naphthylamine by means of acetone and methyl formate proceeds in an analogous manner.

*Example 2*

143 parts of alpha-naphthylamine, 120 parts of acetophenone and 60 parts of methyl formate are heated for two hours at about 210° C. By distilling the reaction mixture, 1-alpha-naphthyl-amino-1-phenylethane having a boiling point of from 233° to 238° C. at 20 millimetres (mercury gauge) is obtained in a yield of 70 per cent.

Similarly 1 anilido-1-phenylethane may be obtained from aniline, acetophenone and methyl formate, mono-isopropyl-aniline from aniline and acetone, mono- and diethylaniline from aniline and paraldehyde and methylisopropylaniline from methylaniline and acetone. The process may also be carried out while producing the formic ester during the reaction of the amines with the aldehydes or ketones. For example an alcohol such as methanol in which a small amount of sodium has been dissolved is introduced together with the other reaction components into an autoclave and carbon monoxide is then pressed into the autoclave. By reacting the contents of the autoclave the desired amines are obtained in good yields.

*Example 3*

684 parts of N-ethyl-alpha-naphthylamine, 264 parts of methyl formate and 440 parts of cyclohexanone are heated for 4 hours in an autoclave at 270° C. The carbon dioxide formed during the reaction is continuously removed through a reflux condenser, a pressure of about 50 atmospheres being maintained in the reaction chamber. As soon as the conversion is completed the reaction product is fractionally distilled in vacuo; pure N-ethyl-N-cyclohexyl-alpha-naphthylamine distils at 168° C. under a pressure of 2.8 millimetres mercury gauge.

*Example 4*

273 parts of dodecylamine, 94.5 parts of methyl formate and 174 parts of cyclohexanone are heated in an autoclave for from 3 to 4 hours at 240° C. while releasing the carbon dioxide formed. As soon as the reaction is completed the content of the autoclave is subjected to fractional distillation, pure N-cyclohexyldodecylamine being obtained which boils at from 171° to 174° C. under a pressure of 4.4 millimetres mercury gauge.

*Example 5*

170 parts of piperidine, 126 parts of methyl formate and 200 parts of cyclohexanone are heated for about 4 hours at 230° C. while releasing the carbon dioxide formed. The content of the autoclave is then subjected to fractional distillation; N-cyclohexylpiperidine distils at from 122° to 123° C. under a pressure of 22 millimetres mercury gauge.

*Example 6*

297 parts of monocyclohexylamine, 294 parts of cyclohexanone and 189 parts of methyl formate are heated for 5 hours at 240° C. while releasing the carbon dioxide formed. After the reaction is completed the reaction mass is subjected to fractional distillation; dicyclohexylamine distils at from 130° to 132° C. under a pressure of 16 millimetres mercury gauge.

*Example 7*

83 parts of piperidine, 106 parts of benzaldehyde and 63 parts of methyl formate are heated for 4 hours in an autoclave at 240° C. The reaction mixture is fractionally distilled and N-benzylpiperidine boiling at from 133° to 134° C. under a pressure of 21 millimetres mercury gauge is obtained.

*Example 8*

198 parts of cyclohexylamine, 120 parts of acetone and 126 parts of methyl formate are heated for 3 hours at 260° C. In the distillation of the reaction product N-isopropylcyclohexylamine boiling at from 93° to 94° C. under a pressure of 64.5 millimetres mercury gauge is obtained.

What I claim is:—

1. The process of producing amines containing at most one hydrogen atom attached to an amino nitrogen atom which comprises causing a carbonyl compound selected from the group consisting of ketones and aldehydes to act at a temperature between about 100° and about 350° C. in the presence of a non-cyclic, saturated alkyl ester of formic acid on an amine containing from 1 to 2 hydrogen atoms attached to an amino nitrogen atom.

2. The process of producing amines containing at most one hydrogen atom attached to an amino nitrogen atom which comprises causing a carbonyl compound selected from the group consisting of ketones and aldehydes to act at a temperature between about 170° and about 300° C. in the presence of a non-cyclic, saturated alkyl ester of formic acid on an amine containing from 1 to 2 hydrogen atoms attached to an amino nitrogen atom.

3. The process of producing amines containing at most one hydrogen atom attached to an amino nitrogen atom which comprises causing a carbonyl compound selected from the group consisting of ketones and aldehydes to act at a temperature between about 210° and about 260° C. in the presence of a non-cyclic, saturated alkyl ester of formic acid on an amine containing from 1 to 2 hydrogen atoms attached to an amino nitrogen atom.

4. The process of producing amines containing at most one hydrogen atom attached to an amino nitrogen atom which comprises causing a carbonyl compound selected from the group consisting of ketones and aldehydes to act at a temperature between about 100° and about 350° C. under a pressure between about 10 and about 100 atmospheres in the presence of a non-cyclic, saturated alkyl ester of formic acid on an amine containing from 1 to 2 hydrogen atoms attached to an amino nitrogen atom.

5. The process of producing amines containing at most one hydrogen atom attached to an amino nitrogen atom which comprises causing a carbonyl compound selected from the group consisting of ketones and aldehydes to act at a temperature between about 100° and about 350° C. under a pressure between about 10 and about 100 atmospheres in the presence of methyl formate, on an amine containing from 1 to 2 hydrogen atoms attached to an amino nitrogen atom.

6. The process of producing amines containing at most one hydrogen atom attached to an amino nitrogen atom which comprises heating a carbonyl compound selected from the group consisting of ketones and aldehydes at a temperature between about 100° and about 350° C. in a closed vessel in the presence of a non-cyclic, saturated alkyl ester of formic acid together with an amine containing from 1 to 2 hydrogen atoms attached to an amino nitrogen atom.

7. The process of producing amines containing at most one hydrogen atom attached to an amino nitrogen atom which comprises heating a carbonyl compound selected from the group consisting of ketones and aldehydes at a temperature between about 100° and about 350° C. in a closed vessel in the presence of methyl formate together with an amine containing from 1 to 2 hydrogen atoms attached to an amino nitrogen atom.

8. The process of producing amines containing at most one hydrogen atom attached to an amino nitrogen atom which comprises heating a carbonyl compound selected from the group consisting of ketones and aldehydes at a temperature between about 100° and about 350° C. in a closed vessel in the presence of methyl formate together with an amine containing from 1 to 2 hydrogen atoms attached to an amino nitrogen atom while continuously releasing partially the carbon dioxide formed in the reaction thus maintaining constant the superatmospheric pressure autogenously developed in the said vessel.

WALTER SPEER.